(12) United States Patent
Yuan et al.

(10) Patent No.: US 11,695,550 B2
(45) Date of Patent: *Jul. 4, 2023

(54) SECURE COMMUNICATION NETWORK

(71) Applicant: Kabushiki Kaisha Toshiba, Minato-ku (JP)

(72) Inventors: Zhiliang Yuan, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 65 days.

This patent is subject to a terminal disclaimer.

(21) Appl. No.: 17/505,720

(22) Filed: Oct. 20, 2021

(65) Prior Publication Data
US 2022/0045855 A1 Feb. 10, 2022

Related U.S. Application Data

(63) Continuation of application No. 16/797,575, filed on Feb. 21, 2020, now Pat. No. 11,196,550.

(30) Foreign Application Priority Data

Feb. 22, 2019 (GB) ..................... 1902472

(51) Int. Cl.
*H04L 9/08* (2006.01)
*H04B 10/70* (2013.01)
(Continued)

(52) U.S. Cl.
CPC ........... *H04L 9/0855* (2013.01); *H04B 10/70* (2013.01); *H04L 9/0643* (2013.01); *H04L 9/3066* (2013.01)

(58) Field of Classification Search
CPC ... H04L 9/0855; H04L 9/0643; H04L 9/3066; H04B 10/70
(Continued)

(56) References Cited

U.S. PATENT DOCUMENTS

2004/0184603 A1* 9/2004 Pearson ................ H04L 9/0855
380/28
2005/0063547 A1* 3/2005 Berzanskis ........... H04L 9/0852
380/278
(Continued)

FOREIGN PATENT DOCUMENTS

JP 2008-504791 A 2/2008
JP 2011-82832 A 4/2011

OTHER PUBLICATIONS

Aldhaheri et al., "A novel secure quantum key distribution algorithm," IEEE Long Island Systems, Applications and Technology (LISAT) Conference 2014, 2014, pp. 1-4, doi: 10.1109/LISAT.2014.6845185. (Year: 2014).*
(Continued)

Primary Examiner — Peter C Shaw
(74) Attorney, Agent, or Firm — Oblon, McClelland, Maier & Neustadt, L.L.P.

(57) ABSTRACT

A method of exchanging a combined cryptographic key between a first node and a second node,
the first node and the second node being connected through a first communication and a second communication network, wherein the first communication network is a quantum communication network wherein information is encoded on weak light pulses; and
the first node and the second node being configured to:
exchange one or more first cryptographic keys on the first communication network;
(Continued)

exchange one or more second cryptographic keys using the second communication network; and form the combined cryptographic key by combining the one or more first cryptographic keys and the one or more second cryptographic keys, such that the first node and the second node share knowledge of the combined cryptographic key.

14 Claims, 11 Drawing Sheets

(51) Int. Cl.
*H04L 9/06* (2006.01)
*H04L 9/30* (2006.01)

(58) Field of Classification Search
USPC ........................................................ 380/278
See application file for complete search history.

(56) References Cited

U.S. PATENT DOCUMENTS

| | | | | |
|---|---|---|---|---|
| 2005/0286723 | A1* | 12/2005 | Vig ........................ | H04L 9/0855 380/278 |
| 2006/0212936 | A1* | 9/2006 | Berzanskis ........... | H04L 9/0852 726/14 |
| 2011/0188659 | A1* | 8/2011 | Khalid .................. | H04L 9/0852 380/278 |
| 2013/0051559 | A1* | 2/2013 | Baba ...................... | H04L 9/083 380/279 |
| 2013/0251145 | A1* | 9/2013 | Lowans ................ | H04L 9/0891 380/44 |
| 2015/0215122 | A1* | 7/2015 | Takahashi ............. | H04L 9/0852 380/283 |
| 2016/0248581 | A1* | 8/2016 | Fu ......................... | H04L 9/0827 |
| 2017/0338952 | A1* | 11/2017 | Hong ..................... | H04L 9/083 |
| 2018/0351734 | A1* | 12/2018 | Zhao ..................... | G06N 10/00 |

OTHER PUBLICATIONS

Makanda et al., "Key Distribution Protocol on Quantum Cryptography," 2013 International Conference on IT Convergence and Security (ICITCS), 2013, pp. 1-2, doi: 10.1109/ICITCS.2013.6717850. (Year: 2013).*

Hegde et al., "A Comparative study on state of art Cryptographic key distribution with quantum networks," 2022 IEEE 3rd Global Conference for Advancement in Technology (GCAT), 2022, pp. 1-7, doi: 10.1109/GCAT55367.2022.9971870. (Year: 2022).*

Zhou et al., "Quantum Network: Security Assessment and Key Management," in IEEE/ACM Transactions on Networking, vol. 30, No. 3, pp. 1328-1339, Jun. 2022, doi: 10.1109/TNET.2021.3136943. (Year: 2022).*

Joppe W. Bos, et al., "Post-quantum key exchange for the TLS protocol from the ring learning with errors problem", 2015 IEEE Symposium on Security and Privacy, May 2015, pp. 553-570.

William Buchanan, et al., "Will quantum computers be the end of public key encryption?", Journal of Cyber Security Technology, vol. 1, No. 1, 2017, pp. 1-22 & cover page.

Douglas Stebila, et al., "Post-quantum Key Exchange for the Internet and the Open Quantum Safe Project", International Conference on Selected Areas in Cryptography, 2016, pp. 14-37.

Logan O. Mailloux, et al., "Post-Quantum Cryptography: What Advancements in Quantum Computing Mean for IT Professionals", IT Professional, vol. 18, No. 5, 2016, pp. 42-47.

Japanese Office Action dated Mar. 30, 2021 in Japanese Patent Application No. 2020-025093 (with English translation), 6 pages.

Alléaume et al.-"Topological optimization of quantum key distribution networks", New Journal of Physics, vol. 11, Jul. 2009, (25 pages).

Examination Report dated Jul. 6, 2021 issued in corresponding patent application GB1902472.8 (3 pages).

Gong et al., "Applied Research on Quantum Key Distribution Technology in Distributed Space TT&C Network", IEEE, doi: 10.1109/WICOM.2009.5302783, 2009, pp. 1-4. (Year: 2009).

Pattaranantakul et al., "Secure and efficient key management technique in quantum cryptography network", IEEE, doi: 10.1109/ICUFN.2012.6261711, 2012, pp. 280-285. (Year: 2012).

Techateerawat, "Network Management System for Quantum Key Distribution", IEEE, doi: 10.1109/ITNG.2012.58, 2012, pp. 807-808. (Year: 2012)

* cited by examiner

SECURE COMMUNICATION NETWORK

CROSS-REFERENCE TO RELATED APPLICATIONS

This application is a continuation of and claims the benefit of priority under 35 U.S.C. § 120 from U.S. application Ser. No. 16/797,575 filed Feb. 21, 2020, and claims the benefit of priority from United Kingdom Application No. 1902472.8 filed 22 Feb. 2019, the entire contents of each of which are incorporated herein by reference.

FIELD

Embodiments described herein relate to apparatus and methods for key exchange in secure communication networks.

BACKGROUND

The exchange of cryptographic keys between two parties underpins the security of modern communication infrastructure. To guarantee the security of the communication infrastructure, the secrecy of the cryptographic keys must be maintained. The secrecy of the cryptographic keys is threatened by attacks by adversaries having access to advanced computing systems, including quantum computers, which may solve particular mathematical problems efficiently.

A quantum communication network may be used to share secret cryptographic keys between two nodes, a source node and a destination node, often referred to as "Alice" and "Bob", and this technique is known as quantum key distribution (QKD). In a quantum communication network, information is sent between a transmitter and a receiver by encoded single quanta, such as single photons. Each photon carries one bit of information encoded upon a property of the photon, such as its polarization, phase or energy/time. The photon may even carry more than one bit of information, for example, by using properties such as angular momentum.

The attraction of QKD is that it provides a test of whether any part of the key can be known to an unauthorized eavesdropper "Eve". In many forms of QKD, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

Independently of QKD, a classical communication network may also be used to share cryptographic keys between two nodes using public key cryptography. The security of public key cryptography relies on the computational hardness of inverting one-way mathematical problems. For example, the RSA algorithm relies on the difficulty in factorizing a product of two large prime numbers. Other algorithms based on similar principles but using different mathematical problems, such as quantum-resistant algorithms (QRA) may also be used. The attraction of QRA is that it uses mathematical problems where the computation of the inversion is not sped up by quantum computers. Thus, exchanging cryptographic keys between two nodes using QRA is believed to be resilient to attacks by quantum computers.

BRIEF DESCRIPTION OF THE FIGURES

Devices and methods in accordance with non-limiting embodiments will now be described with reference to the accompanying figures in which.

DETAILED DESCRIPTION OF FIGURES

Figure 1:
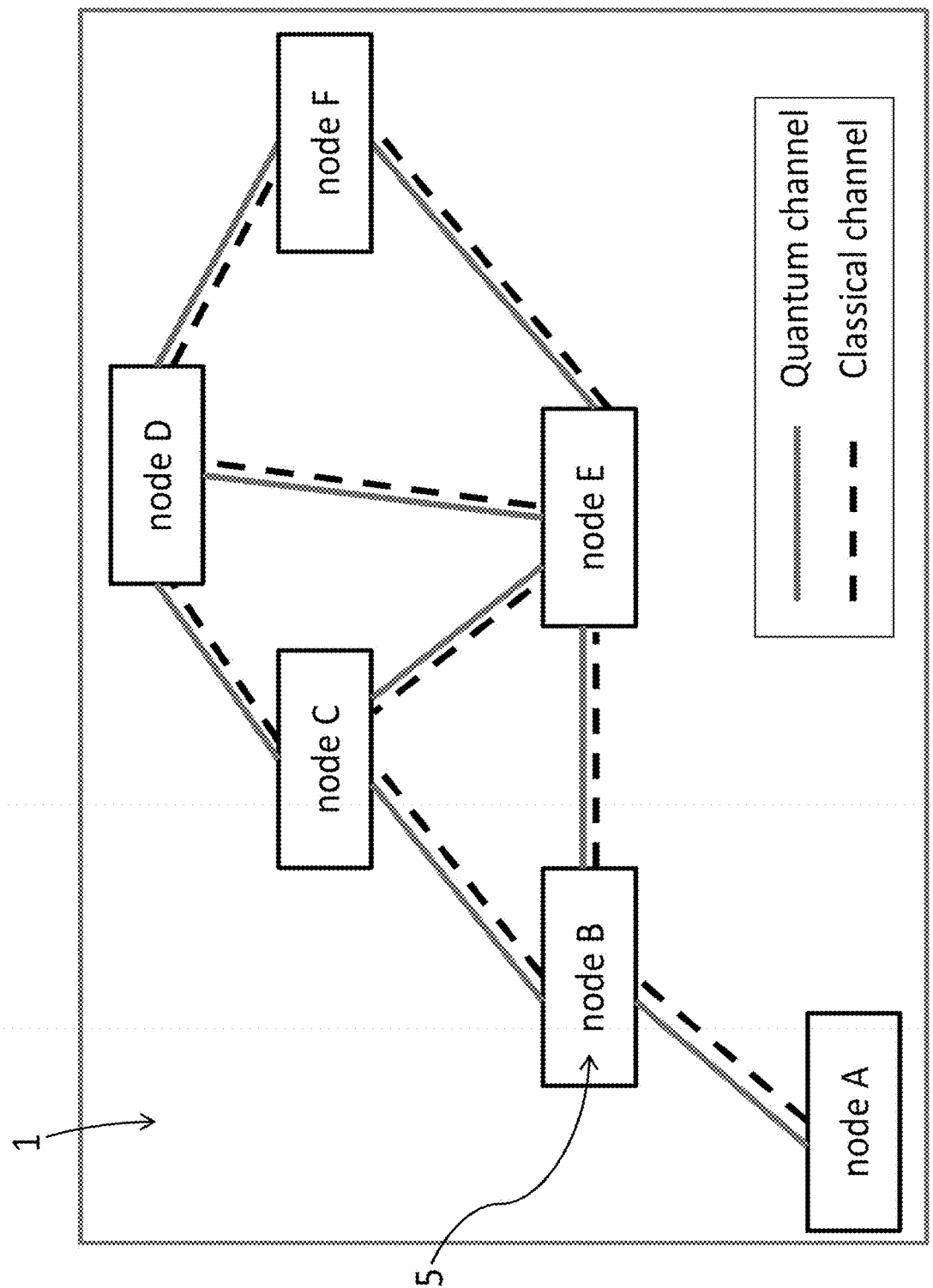
FIG. 1 shows a schematic illustration of a quantum communication network, wherein a source node A and a destination node F are linked to each other through repeater nodes B, E, C, and D.

According to a first aspect of the invention, there is provided a method of exchanging a combined cryptographic key between a first node and a second node, the first node and the second node being connected through a first communication and a second communication network, wherein the first communication network is a quantum communication network wherein information is encoded on weak light pulses; and the first node and the second node being configured to:

exchange one or more first cryptographic keys on the first communication network;

exchange one or more second cryptographic keys using the second communication network; and form the combined cryptographic key by combining the one or more first cryptographic keys and the one or more second cryptographic keys, such that the first node and the second node share knowledge of the combined cryptographic key.

According to a second aspect of the invention, there is provided a communication network for exchanging a combined cryptographic key between a first node and a second node, wherein the first node and the second node are connected through a first communication and a second communication network, the first communication network being a quantum communication network wherein information is encoded on weak light pulses; and the first node and the second node are configured to:
exchange one or more first cryptographic keys on the first communication network;
exchange one or more second cryptographic keys using the second communication network; and
form the combined cryptographic key by combining the one or more first cryptographic keys and the one or more second cryptographic keys, such that the first node and the second node share knowledge of the combined cryptographic key.

According to a third aspect of the invention, there is provided a first node configured to exchange a combined cryptographic key with a second node on a communication network, the first node being connected to at least one intermediate node through a first communication network, the first communication network being a quantum communication network wherein information is encoded on weak light pulses;

the first node being directly connected to the second node using a second communication network;

the first node and the second node being further configured to:
exchange one or more first cryptographic keys on the first communication network;
exchange one or more second cryptographic keys using the second communication network; and
form the combined cryptographic key using the one or more first cryptographic keys and the one or more second cryptographic keys, such that the first node and the second node share knowledge of the combined cryptographic key.

A quantum communication network between one node Alice and another node Bob may be called a QKD link. QKD links suffer from limited distance reach and to connect nodes that are far from each other, intermediate nodes are required. To guarantee the secrecy, the intermediate nodes have to be trusted nodes, and with an increasing number of intermediate nodes, the risk of a node being compromised also increases. In the field of QKD, the solution has been to route quantum keys through at least two independent paths within a quantum network and then combine the quantum keys obtained from the independent paths, such that compromise of an intermediate node in one path does not affect the secrecy of the combined quantum key.

Separately, public key cryptography, with increasingly robust algorithms such as QRA, has been used as an alternative to QKD key exchange. Classical key exchanges such as QRA may be viewed as preferable solutions because the key exchange does not require on intermediate nodes and is therefore technically more efficient to implement than using intermediate nodes in a QKD, where each pair of nodes requires significant infrastructure. Thus, classical key exchange such as QRA is viewed as an alternative to QKD.

The disclosed method, network and or nodes provide an improvement to the security of communication networks by realising the shortcomings of QKD and exploiting the benefits of classical key exchange techniques to implement a hybrid network combining both QKD and classical key exchange. The effect of this combination is a more efficient yet secure communication network.

In an embodiment, the first communication network comprises at least one intermediate node, other than the first node and the second node, said intermediate node configured to receive and transmit a signal encoded on weak light pulses.

In another embodiment, the first node is configured to send information through the first communication network to:
exchange a quantum cryptographic key with the at least one intermediate node;
generate a local secret key, the local secret key being used to form the one or more first cryptographic keys;
form a further key using the local secret key and the quantum cryptographic key; and
transmit the further key to the at least one intermediate node.

In another embodiment, the at least one intermediate node is configured to:
receive the further key;
extract the local secret key using the further key and the exchanged quantum cryptographic key;
form a second further key using the local secret key and the second quantum cryptographic key; and
transmit the second further key to another of the at least one intermediate node or to the second node.

In another embodiment, the second node is configured to:
receive the second further key; and
extract the local secret key using the second further key and the second quantum cryptographic key, such that the second node has knowledge of the local secret key generated by the first node.

In another embodiment, the second communication network is a classical network directly connecting the first node and the second node, the second communication network comprising a communication channel between the first node and the second node.

In another embodiment, the second cryptographic key is exchanged between the source node and the destination node using a classical key exchange protocol.

In another embodiment, the classical key exchange protocol uses a quantum-resistant algorithm.

In another embodiment, the quantum-resistant algorithm comprises lattice, multivariate, hash, code, and supersingular elliptic curve cryptography.

In another embodiment, the one or more first cryptographic keys and the one or more second cryptographic keys are combined using operations comprising exclusive-or, and/or universal hashing, and/or pseudorandom functions.

In another embodiment, the one or more first cryptographic keys have equal lengths with the one or more second cryptographic keys.

In another embodiment, the one or more first cryptographic keys have different lengths from the one or more second cryptographic keys.

In another embodiment, the first node and the second node are configured to store the one or more first cryptographic keys in an indexed key store, wherein each entry in the indexed key store corresponds to a particular pair of the first node and the second node.

In another embodiment, the first node and/or the second node comprises a counter, the value of the counter being used to select the one or more first cryptographic key corresponding to the particular pair of the first node and the second node.

In another embodiment, the counter is incremented after the one or more first cryptographic keys is provided.

In another embodiment, the first communication network comprises at least one intermediate node, other than the first node and the second node, said intermediate node configured to receive and transmit a signal encoded on weak light pulses.

FIG. 1 is a schematic of a quantum communication network 1 comprising nodes A to F. Each node is connected to at least one other node. In the configuration of FIG. 1, communication takes place between two nodes when there is a quantum transmitter in one node and a quantum receiver in the other node.

In a quantum communication network, information sent between a quantum transmitter and a quantum receiver is encoded as single quanta, such as single photons. Each photon carries one bit of information encoded upon a property of the photon, such as its polarization, phase, or energy/time. The photon may carry more than one bit of information, for example, by using properties such as angular momentum.

In a quantum communication network in general, a quantum transmitter will be capable of encoding information on weak light pulses. A quantum receiver will be capable of decoding this information. Either discrete variable (DV) or continuous variable (CV) quantum information can be encoded. In DV QKD, weak coherent light pulses (WCP) can be generally thought of as light pulses that have a probability of containing less than one photon per pulse on average during quantum encoding, the information is encoded on weak light pulses using polarisation, phase, and time-bin information etc. In CV QKD, each WCP pulse can contain up to 100 photons per pulse on average.

A DV QKD system consists of a QKD transmitter and a QKD receiver. The quantum transmitter transmits an encoded quantum signal pulses, each of which contains on average less than one photon per pulse. These optical signals are transmitted through a quantum channel before reaching the quantum receiver, which decodes the incoming signals and detects them using single photon detectors.

For ease of language, the term quantum communication unit 101 will be used to refer to either a quantum transmitter and/or a quantum receiver. In an embodiment, if a node is connected to two other nodes, it has a dedicated quantum communication unit at each end of the connection. Thus, in an embodiment, every node has a number of quantum communication units that equals the number of connections to that node. Alternatively, each node may have a single quantum communication in combination with a switching device which sequentially connects the end of each connection to the quantum communication unit.

In a quantum communication network 1, such as the one illustrated in FIG. 1, communication between two nodes takes place through a quantum channel. The quantum channel may be implemented in an optical fibre connection. The quantum channel can be chosen to operate at any wavelength that is suitable for transmission over optical fibre channel which typically supports only one optical mode and is usually referred to as single mode fibre. For example, the quantum wavelength can be chosen at 1310 nm or at 1550 nm. When a quantum communication network is used to perform QKD, the quantum channel is also called a QKD link. Quantum channels are shown as solid lines between nodes in FIG. 1.

The embodiment described herein is not limited to information being encoded on weak light pulses using a particular degree of freedom such as polarization, phase and time-bin etc. In fact, encoding can be applied upon one of, or a mixture of, many different degrees of freedoms, such as phase, polarisation and time-bin etc.

Further, the embodiments described herein are not limited to a certain QKD protocol. It is applicable to different QKD protocols, such as BB84, B92, differential-phase-shift (DPS), coherent-one-way protocol and round-robin DPS protocols.

In some embodiments, for QKD operation, supporting classical optical channels are provided for realising functions of clock synchronisation and for exchanging messages for sifting between the QKD transmitter and receiver. Supporting optical classical channels are shown as dashed lines between nodes in FIG. 1. While these classical channels can be placed into a separate fibre, wavelength division multiplexing is often used to combine both these classical channels and quantum channel so that they can all be transmitted through the same fibre.

In some cases, QKD need to share the same fibre with additional data traffic in the same fibre. In this case, a wavelength filter may be used to combine/separate QKD signals (quantum, synchronisation and classical) and additional data signal. It is preferable to assign a wavelength group to accommodate QKD optical signals, for example, a coarse-wavelength-division-multiplexing (CWDM) band within Telecom C-band. Further details of a QKD system will be provided below.

Returning to the quantum communication network 1 of FIG. 1, nodes are connected to each other using point-to-point QKD links. Point-to-point QKD links suffer from a limited distance reach over optical fibre connections due to losses that increase exponentially with distance. Therefore, to exchange a first cryptographic key, which is referred to as a quantum key, between source node A and destination node F, it is necessary to route the quantum key through intermediate nodes that act as repeater nodes.

Figure 1B:
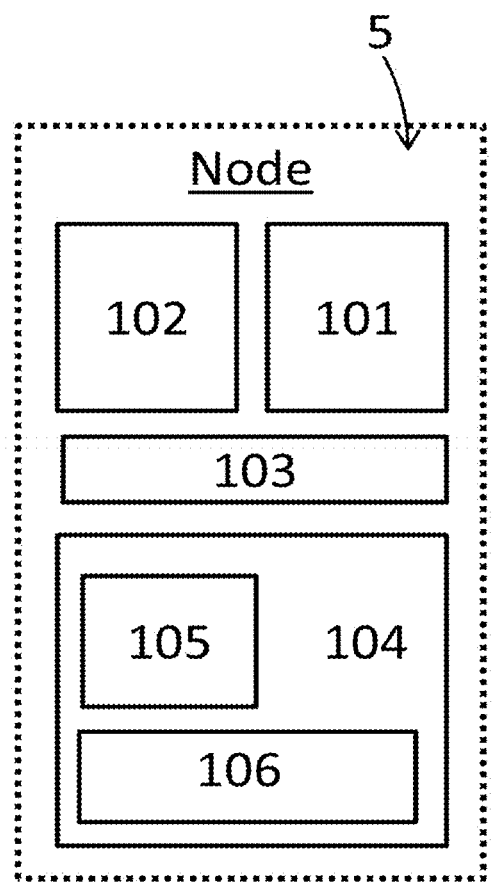
FIG. 1(b) shows a schematic illustration of a node used in the quantum communication network shown in FIG. 1.

In an embodiment, shown in FIG. 1(b) a node 5 in the quantum communication network 1 will contain at least a first key generator (102), together with at least one quantum communication unit (101). The first key generator (102), together with the quantum communication unit (101), is configured to implement an agreed QKD protocol using the quantum communication network 1. The node 5 may further comprise a key store 103 for storing indexed shared keys, a local key generator 104 for generating and transmitting a local key. The local key generator 104 may comprise a local secret generator 105 and a key combiner 106. The local secret generator 105 generates a local secret key. The key combiner 106 may be configured to form a further key by combining a key from the key store 103 with a local secret key from the local secret generator 105. The local key generator 104 may be further configured to transmit the further key—the transmission may be through a classical communication link or through a quantum communication link. The node may contain a processor configured to implement the QKD protocol. The processor may be a central processing unit (CPU), graphical processing unit (GPU), or a field programmable gate array (FPGA). Details of a QKD protocol demonstrating how a first cryptographic key is shared or exchanged will be described below.

Repeater nodes are nodes on the quantum communication network 1 that are connected to at least two other nodes. Repeater nodes comprise at least a quantum communication unit (101) and a first key generator (102) to serve each connection.

In FIG. 1, source node A and destination node F comprise at least a quantum communication unit and at least a first key generator 102 configured to implement an agreed QKD protocol at the end of each connection. Node A has a quantum communication unit 101 and a first key generator 102 configured to transmit information to Node B over the quantum channel. Node F has a quantum communication unit and a first key generator configured to transmit information to Node D over a QKD link, and a quantum communication unit and a first key generator configured to transmit information to Node E over another QKD link.

Thus, every node has a number of first key generators 102 and a number of quantum communication units 101 that equal the number of connections to that node. Alternatively, each node may have a single first key generator 102 and a single quantum communication unit 101 as well as a switching device which sequentially connects the end of each connection to the quantum communication unit.

The quantum communication network may comprise a network controller, the network controller being adapted to direct a signal relating to a first cryptographic key from a source node to a destination node via at least one repeater node.

In the quantum communication network illustrated in FIG. 1, the quantum key may be routed from A to F through the following nodes: A→B→E→F; A→B→C→D→F; A→B→E→D→F, and so on.

Generation and exchange of a quantum key between nodes A and F, denoted $K_{QKD}$, may be performed as follows. As an example, the communication chain A→B→E→F is considered. A and B first execute a QKD protocol to generate a key $K_{AB}$; B executes a QKD protocol with E to generate $K_{BE}$; A encrypts secret information $K_S$ with $K_{AB}$, and transmit to B, over a supporting classical channel. B obtains $K_S$ by decrypting with $K_{AB}$, and B re-encrypts $K_S$ with $K_{BE}$ and transmits it to node E over a supporting classical channel. Similarly node E executes a QKD protocol with node F to generate a key $K_{EF}$, E decrypts the message from B to obtain $K_S$, re-encrypts $K_S$ with $K_{EF}$, and transmits the encrypted information to F over a supporting classical channel. End node F deciphers the message from E using $K_{EF}$ to obtain $K_S$. End nodes A and F now have knowledge of the secret information $K_S$. A shared secret key between nodes A and F, $K_{QKD}$, can be derived from secret information $K_S$ according to an appropriate protocol. Details of a QKD protocol that could be implemented to exchange keys between each pair of nodes will be described below.

Figure 3:
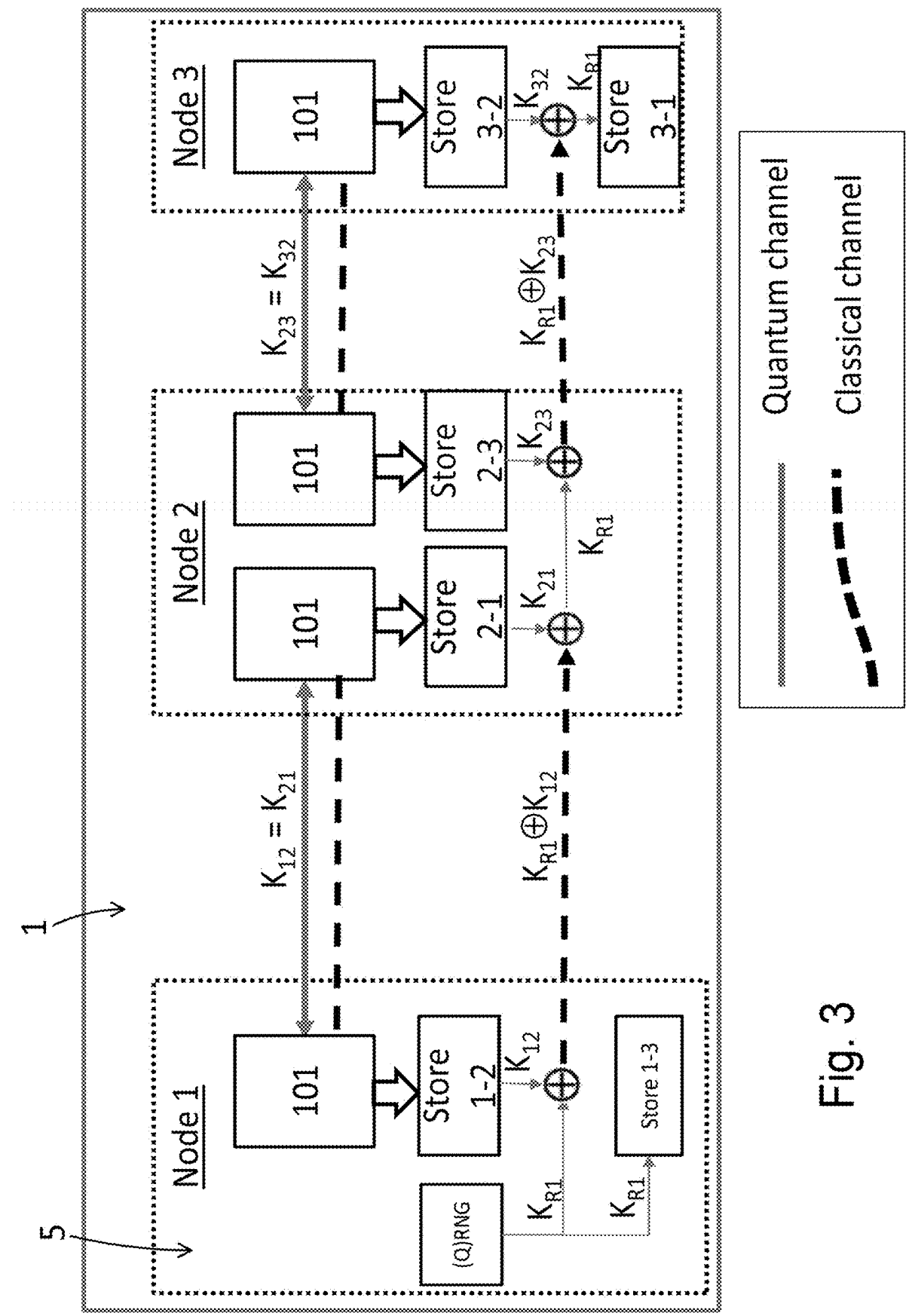
FIG. 3 shows a schematic illustration of a first node and a second node, connected via an intermediate node, using the quantum communication network of FIG. 1.

QKD Key exchange according to one example is described in FIG. 3. Nodes 1, 2 and 3 are three QKD nodes in a quantum communication network 1. Node 1 is termed the first node, node 3 is termed the second node, and node 2 is an intermediate node. The first node and the second nodes are end-nodes. Each node consists at least a quantum communication unit 101. Each quantum communication unit 101 comprises a QKD transmitter and/or a QKD receiver. In this example, Nodes 1 and 3 do not have a direct QKD link and their shared quantum keys have to be formed via Node 2, which has a QKD link with each of node 1 and node 3. For each pair of nodes, there is a pair of quantum cryptographic keys ($K_{12}$, $K_{21}$, $K_{23}$, $K_{32}$) that is stored between them. For each pair of nodes, each quantum cryptographic key of the pair of quantum cryptographic keys is identical to each other. In each node of the pair of nodes, the quantum cryptographic key corresponding to that pair is indexed and stored. For example, node 1 and node 2 share QKD keys $K_{12}$ and $K_{21}$, where $K_{12}=K_{21}$, and node 1 contains a key store "store 1-2" containing $K_{12}$, while and node 2 contains a key store "store 2-1" containing $K_{21}$. Node 2 and node 3 share QKD keys $K_{23}$ and $K_{32}$, where $K_{23}=K_{32}$, node 2 contains a key store "store 2-3" containing $K_{23}$, while node 3 contains a key store "store 3-2" containing $K_{32}$. More generally, in QKD nodes having a direct QKD link, the key stores between them will be filled with quantum keys generated between them.

Node 1 also contains a local key generator 104. The local key generator 104 comprises a local secret generator 105 and a key combiner 106. The local secret generator 104 may be a random number generator (RNG). A RNG is configured to generate a sequence of numbers that cannot be reasonably predicted better than by a random chance. In a further embodiment, the local secret generator may be a quantum random number generator (QRNG). A QRNG is a RNG that relies on quantum mechanical physical property, e.g., shot noise, or random phases in vacuum field, to generate the sequence of random numbers. The (Q)RNG is used to generate a local random secret, $K_R$. The key combiner 106 is used to combine the local random secret $K_R$ with a key from the key store 103 to form a further key. In this example, the further key is $K_{R1} \oplus K_{12}$ and this is transmitted to node 2; however, it will be understood that a different operation and/or a different key from a different key store could be used to form a further key that is sent to a different node.

Between nodes without a direct QKD link, e.g., node 1 and node 3, their mutual key stores "store 1-3" and "store 3-1" are populated in such a way described below. First, node 1 uses its RNG or QRNG device to generate local secret $K_{R1}$. $K_{R1}$ is stored in the key store 1-3, and $K_{R1}$ combined with $K_{12}$ to form a further key $K_{R1} \oplus DK_{12}$. The further key $K_{R1} \oplus K_{12}$ is then transmitted to node 2. At node 2, $K_{R1}$ is obtained from $K_{R1} \oplus K_{12} \oplus K_{21} = K_{R1}$. $K_{R1}$ is combined with a second quantum cryptographic key $K_{23}$ from the "store 2-3" key store to form a second further key $K_{R1} \oplus K_{23}$, and the second further key $K_{R1} \oplus K_{23}$ transmitted to node 3. At node 3, $K_{R1}$ is obtained from $K_{R1} \oplus K_{23} \oplus K_{32} = K_{R1}$, and the retrieved $K_{R1}$ is stored in key store "store 3-1". Therefore, the local secret $K_{R1}$, generated by node 1, has become known to node 3, and is stored in the mutual key stores "store 1-3" and "store 3-1" in nodes 1 and 3 respectively. More generally, between a node N without a direct link node 1, the local secret $K_{R1}$ is stored in the mutual key stores "store 1-N" and "store N-1" in nodes 1 and N respectively.

The security of the exchanged key requires that each repeater node is a trusted node as each repeater node has knowledge of secret information $K_S$ or $K_{R1}$; compromise to a single node may compromise the security of the entire network. In the network shown in FIG. 1, a breach of secrecy in node B, for example, compromises the security of the key exchange from node A to node F. In the example shown in FIG. 3, a breach of secrecy in node 2 compromises the security of the key exchange because node 2 has knowledge of $K_{R1}$.

Transmitting and detecting quantum signals through the quantum channel generates raw quantum keys between two end nodes. These raw QKD keys that are produced by end nodes may be further processed to correct errors and improve secrecy. Improving secrecy includes the method of privacy amplification where the keys produced by the end nodes are shortened, for example, by using universal hash functions, such that any eavesdropper would have negligible information about the new amplified key. In the description above in relation to FIG. 3, $K_{12}$, $K_{21}$, $K_{23}$, $K_{32}$ represent the keys that have been processed and are the keys that are stored in the key stores.

For completeness, a description of a QKD system that can be applied to any of the embodiments follows below. In the description below, the first key generator 102 and the first communication unit 101 at the source node act as "Alice", while the first key generator 202 and the first communication unit 201 at the destination node act as "Bob".

Figure 2:
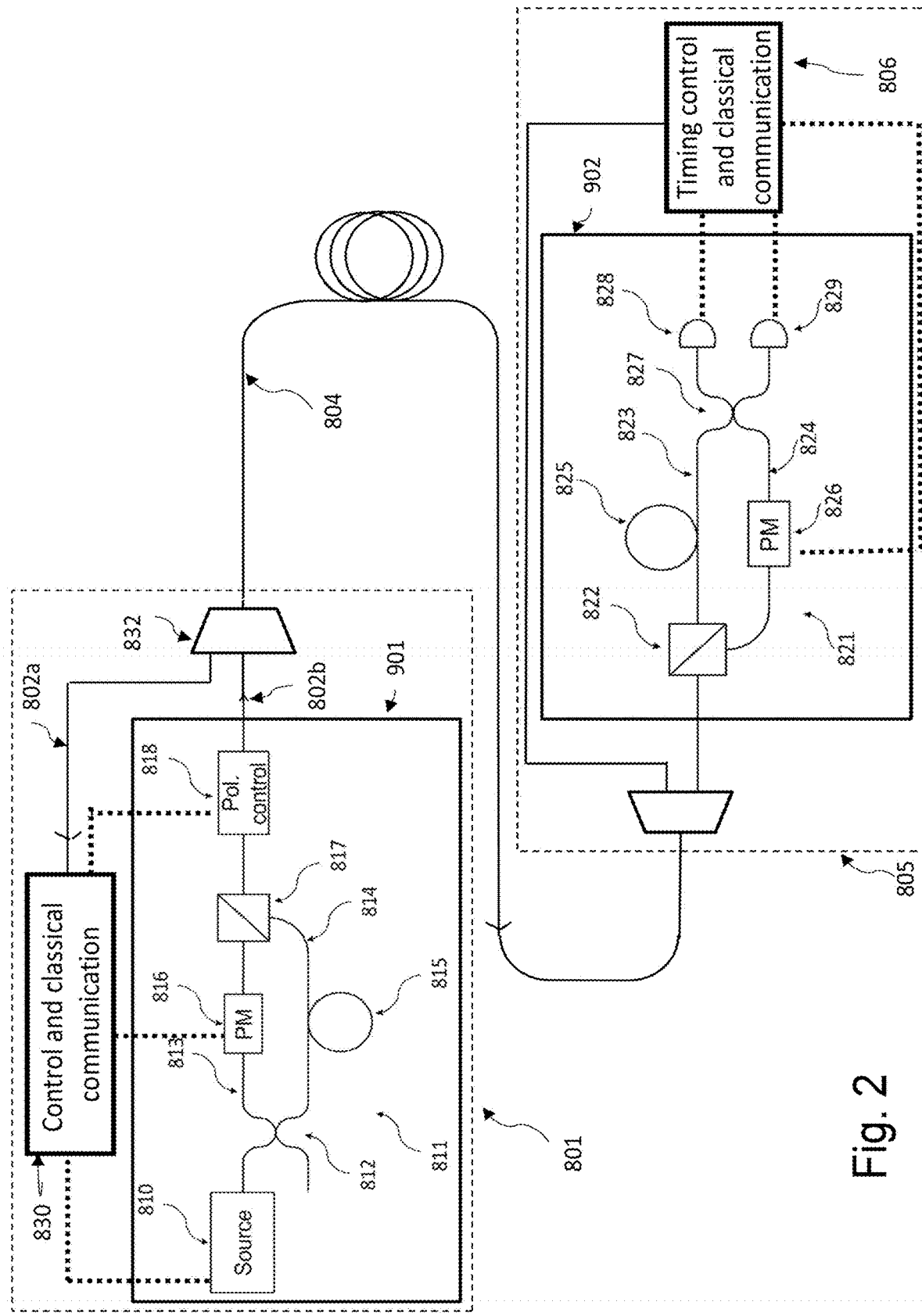
FIG. 2 shows a schematic illustration of quantum communication system that could be used to implement a quantum channel in the network shown in FIG. 1.

FIG. 2 is a schematic illustration of a quantum communication system suitable for implementing a QKD link. In this embodiment the quantum transmitter 101 and the quantum receiver 201 are based on asymmetrical Mach-Zehnder interferometers (MZI). Transmitter unit 801 comprises quantum transmitter 901 and classical communication device 830. Receiver unit 805 comprises quantum receiver 201 and classical communication device 806. Quantum transmitter 901 and quantum receiver 902 are connected through fibre 802b, wavelength division multiplexer 832, and fibre channel 804. Classical communication device 830 and classical communication device 806 are connected through fibre 802a, wavelength division multiplexer 832 and fibre 804. This is referred to as the classical channel Photon source 810 inside quantum transmitter 901 generates a quantum signal, comprising pulses of light. The pulses are then encoded using the asymmetrical MZI 811. The pulses are directed into a beam splitter 812. One output of the beam splitter 812 is connected to a phase modulator 816. The output of the phase modulator 816 is connected to polarising beam splitter 817. This forms the short arm 813 of the interferometer. The other output of the beam splitter 812 is connected to a fibre loop 815, which is in turn connected to polarising beam splitter 817. This forms the long arm 814 of the interferometer. Light pulses travelling the long arm 814 are delayed with respect to light pulses travelling the short arm 813.

Quantum transmitter 901 may also comprise an intensity modulator configured to vary the intensity of light pulses. The intensity modulator may be configured to realise a decoy-state QKD protocol, in which pulses of different intensities are sent which allows the sender and receiver to determine the presence of an eavesdropper by measuring the number of pulses which have been safely received with the different intensities. The transmitter may comprise more than one intensity modulator.

Phase modulator 816 is configured to apply a modulation to the phase of a light pulse travelling the short arm 813. A phase modulator can comprise a crystal waveguide, such as a $LiNbO_3$ crystal waveguide, in which the refractive index is a function of electric field strength. Alternatively the phase modulation can be provided by passive means, for example, a plurality of fixed phase elements which are each configured to apply a different fixed phase difference and a switch configured to select each of the said components.

The polarisation of a light pulse travelling from the short arm 813 of the interferometer is flipped by the polarizing beam splitter 817, from a first polarisation to a second polarisation, which is orthogonal to the first polarisation.

The quantum transmitter 901 therefore generates coherent double pulses with a chosen phase difference and orthogonal polarization travelling down the fibre link 804. A polarisation controller 818 corrects any deviation of the polarisation of the pulses. Each quantum transmitter at each ONU may use a separate polarisation controller to align the polarisation of the pulses arriving at the receiver individually. The quantum transmitters may be pre-compensated. Alternatively, a single polarisation controller could be installed at the receiver side.

Quantum light pulses exit the quantum transmitter 901 and are sent via fibre 802-1b to wavelength division multiplexer 832. The quantum signals are transmitted with a first wavelength. Wavelength division multiplexer 832 sends signals inputted from fibre 802-1b into fibre 804. The quantum signals are sent via fibre 804 to the quantum receiver 902.

In the quantum receiver 902 the pulses are decoded using the asymmetrical MZI 821. The short arm 824 of the interferometer 821 comprises a phase modulator 826, such as has been described previously. The long arm 823 of the interferometer comprises a fibre loop 825, which exactly matches the fibre loop 815 in the transmitter. The long arm 823 and the short arm 824 are each connected to one of the outputs of the polarizing beam splitter 822 and to one of the inputs of beam splitter 827.

The polarizing beam splitter 822 sends a light pulse that enters with the second polarization down the long arm 823 of the interferometer and a light pulse that enters the polarizing beam splitter with the first polarization down the short arm 824. The polarization of a pulse travelling through the polarizing beam splitter 822 with the second polarisation is flipped to the first polarisation.

The outputs of beam splitter 827 are connected to photon detectors 828 and 829. Depending on the phase modulation applied at the transmitter 901 and the receiver 902, a signal will either be detected in photon detector 828 or in photon detector 829. Photon detectors 828 and 829 may be gated single-photon detectors which may be based on avalanche photo-diodes and specifically may be based on InGaAs avalanche photo-diodes. The detectors may be gated detectors such as self-differencing detectors. Self-differencing detectors perform time-filtering automatically. Time-filtering is possible due to the known arrival times of the quantum signals. The detector can be only activated during times photons are incident on the detector. Self-differencing may decrease the Raman noise by a factor of about 10.

Using phase modulator 816 and phase modulator 826 a QKD protocol such as BB84 can be realized.

In the BB84 protocol, Alice (operating on transmitter unit 801) selects a phase value at random from four equally spaced phase values. For example, Alice can randomly set the phase modulator 816 to one of four different values, corresponding to phase shifts of 0, $$\frac{\pi}{2}, \pi, \text{ and } \frac{3\pi}{2}.$$

0 and $\pi$ are associated with bits 0 and 1 in a first encoding basis, while $$\frac{\pi}{2} \text{ and } \frac{3\pi}{2}$$

are associated with 0 and 1 in a second encoding basis.

Bob (operating on receiver unit 805) can randomly set the phase modulator 826 to one of two values, corresponding to a phase shift of 0 or $$\frac{\pi}{2}.$$

This amounts to selecting between the first and second measurement bases, respectively. In other words, Alice's 0 and π values are compatible with Bob's $$\frac{\pi}{2}$$

value (first basis), and Alice's $$\frac{\pi}{2} \text{ and } \frac{3\pi}{2}$$

values are compatible with Bob's $$\frac{\pi}{2}$$

value (second basis).

A phase difference of 0 (i.e. the phase shift applied by Alice is 0 and the phase shift applied by Bob is 0 or the phase shift applied by Alice is $$\frac{\pi}{2}$$

and the phase shift applied by Bob is $$\frac{\pi}{2}),$$

leads to a detection at a detector 828. If, on the other hand, there is a phase difference of π (i.e. the phase shift applied by Alice is π and the phase shift applied by Bob is 0 or the phase shift applied by Alice is $$\frac{3\pi}{2}$$

and the phase shift applied by Bob is $$\frac{\pi}{2})$$

there will be a detection at detector 829. For any other value of difference between the phase modulation applied at the two phase modulators, there will be a finite probability that a photon may output at detector 828 or detector 829.

Neither Alice nor Bob knows what values the other chooses or will choose when choosing their values. Only afterwards do they compare whether they used the same basis, and then only use the values for the final key where they used the same basis. The results from any measurements performed using a different basis are discarded.

This process is known as sifting. In this manner, Alice (source node) and Bob (destination node) have exchanged and have knowledge of a secret key.

The quantum signals with regular arrivals are detected by the detectors 828 and 829 in the quantum receiver 201. Following each detection event, the transmitter which sent the photon is identified from the arrival time of the photon. Then, the receiver 902 initiates the sifting process by communicating the time arrival and decoding basis with the identified transmitter, from the classical communication device 806 to classical communication device 830. Repeating this process for each detected photon, each one of the transmitters will form a sifted key sequence with the receiver 902 with lengths of, for example, at least a few thousands bits. Then, the transmitter and the receiver can start error correction and privacy amplification processes to distil a perfectly secret key between them. The classical communication device 806 may be responsible for classical communication between the transmitter and the receiver for error correction and privacy amplification.

Figure 4:
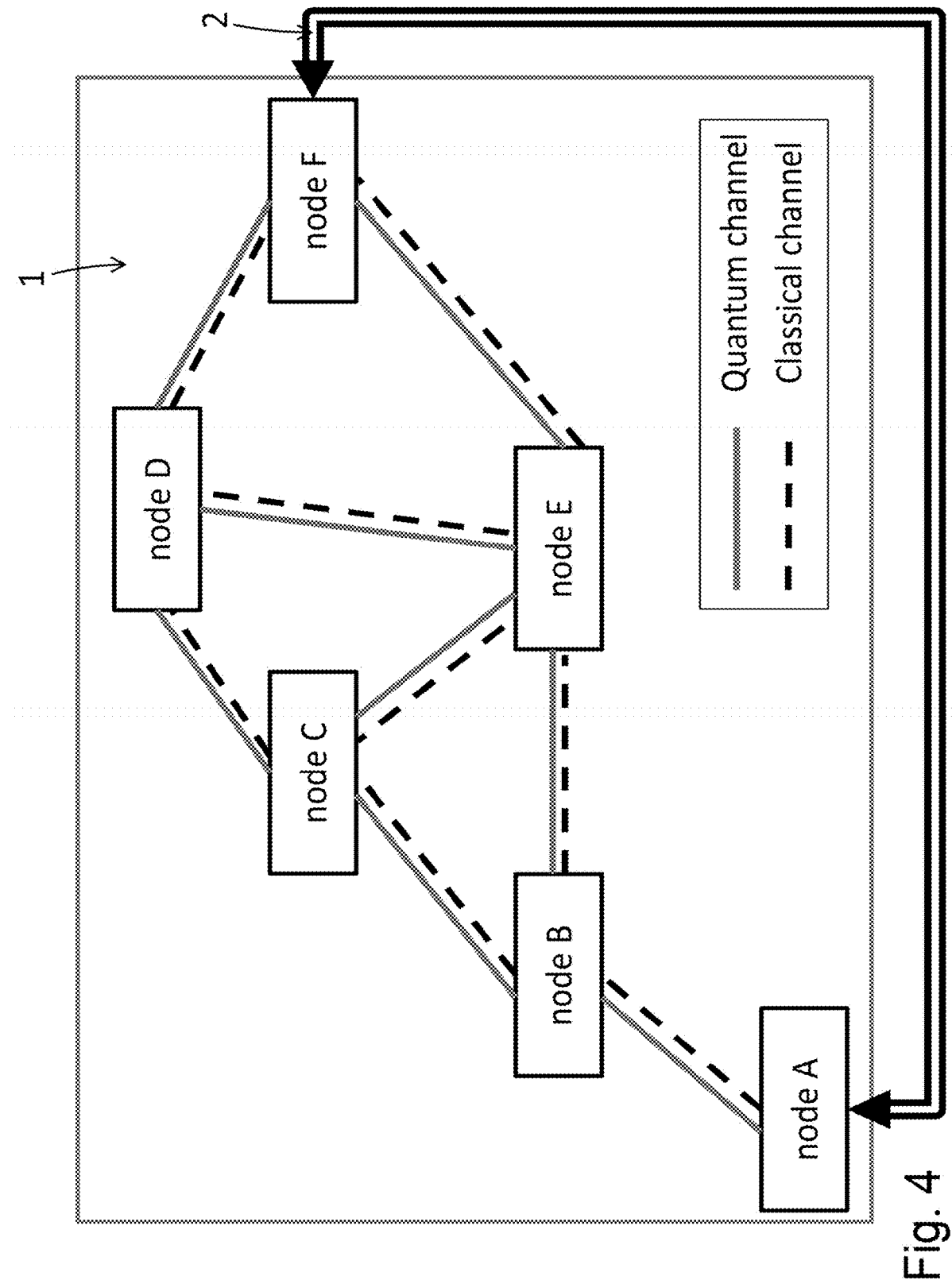
FIG. 4 shows a schematic illustration of the quantum communication network of FIG. 1, wherein end nodes A and F are further linked to each other through a second communication network.

FIG. 4 is a schematic of a communication network in accordance with an embodiment. The network is based on the quantum communication network 1 shown in FIG. 1. However, the end nodes A to F are further linked to each other through a second communication network 2. The second communication network 2 may be implemented as a classical communication network which does not suffer from the limited distance reach of QKD links and therefore, nodes A and F are further linked through a second communication network 2 without relying on intermediate repeater nodes.

Information transferred on the second communication network 2 is independent from the information transferred on the first communication network 1. The second communication network 2 may use the same fibre, as illustrated in FIG. 2 and described above. In this case, the information relating to the first communication network 1 is separated from information relating to the second communication network 2 by CWDM, for example. The second communication network 2 may also use a spatially separate channel from the first communication network 1. In either case, the information in each communication network is independent and separate.

Figure 5:
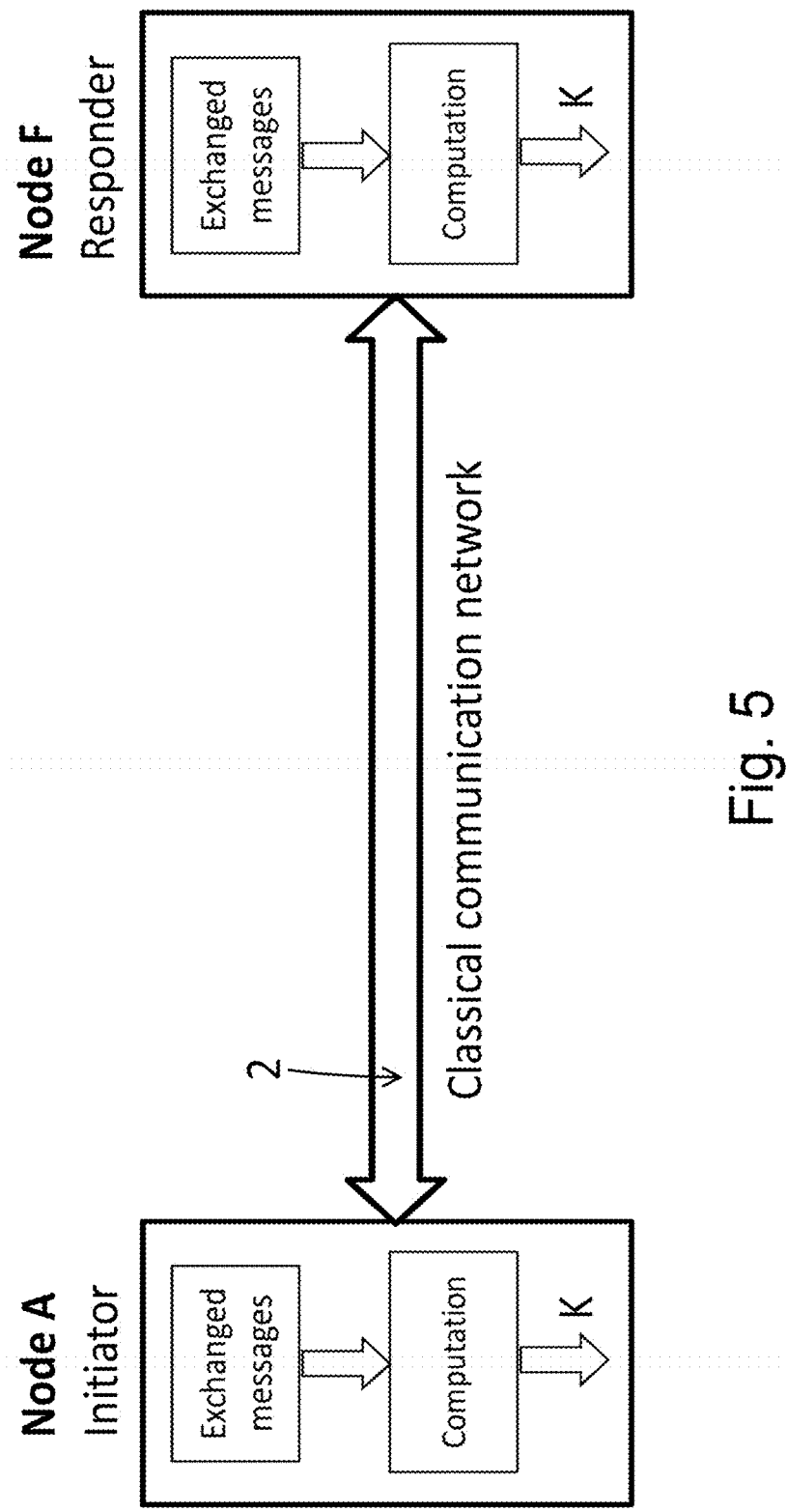
FIG. 5 shows a schematic of an initiator node (Node A) linked to a responder node (Node F) through the second communication network.

The quantum communication network 1 may be used to implement QKD, as explained above in relation to FIGS. 1, 2 and 3. The second communication network 2 may be used to perform classical key exchange (CKE). FIG. 5 shows a schematic illustration of an initiator node (node A) and a responder node (node F) linked by the second communication network 2. In the example of FIG. 5, the second communication network is a classical communication network. The classical communication network 2 may be a public network. The classical communication network 2 directly connects the first node to the second done; directly connects means that the connection does not rely on intermediate nodes such as node 2 of FIG. 3. The classical communication network may be a public channel. The public channel may be the Internet Each node is configured to transmit and receive—in other words, to exchange-messages, and to compute a shared cryptographic key from the exchanged messages. Each node may contain a processor configured to implement a classical key exchange (CKE) protocol. The processor may be a central processing unit (CPU), graphical processing unit (GPU), or a field programmable gate array (FPGA). The shared cryptographic key exchanged on the second communication network 2 is the second cryptographic key exchanged between the end nodes A and F. The second cryptographic key may be exchanged according to a (CKE) protocol and the second cryptographic key is represented by $K_{CKE}$. Examples of CKE protocols are described further below.

Returning to the network of FIG. 4, the source node and the destination node share two keys; a first key ($K_{QKD}$), and a second cryptographic key ($K_{CKE}$). $K_{QKD}$ is exchanged through the quantum communication network 1, through intermediate repeater nodes, as described herein. $K_{CKE}$ is securely exchanged through the second communication network 2. Both keys $K_{QKD}$ and $K_{CKE}$ may be considered secure. The security of $K_{QKD}$ relies on the intermediate repeater nodes being trusted nodes, while the security of $K_{CKE}$ depends on the protocol used.

In an embodiment, the second cryptographic key, $K_{CKE}$, is exchanged according to a conventional key exchange protocol; an example is the Diffie-Hellman protocol and is described below. In another embodiment, the second cryptographic key, $K_{CKE}$, is exchanged according to a quantum resistant algorithm (QRA). Examples of QRA are described below. The source node and the destination node then further contain a processor configured to implement a quantum resistant algorithm. The processor may be a central processing unit (CPU), graphical processing unit (GPU), or a field programmable gate array (FPGA).

The source node and the destination node are configured to form a combined cryptographic key, $K_F$, from the two keys $K_{QKD}$ and $K_{CKE}$. The source node and the destination node thus comprise a final key generator, configured to combine two keys $K_{QKD}$ and $K_{CKE}$ into a combined cryptographic key $K_F$, according to a chosen operation.

In an embodiment, the combined cryptographic key is formed using the following operation $K_F = K_{QKD} \oplus K_{CKE}$, where $\oplus$ is the bit-wise exclusive-or logical operation. In another embodiment, the final key is formed using a pseudo random function (PRF). Forming a combined cryptographic key using a PRF comprises the steps of using a hash function to map the input keys of arbitrary lengths to hash values of fixed size, and applying a pseudo random function to the hashed input data to generate an output key of arbitrary length. Thus, forming a key with PRF allows the inputs $K_{QKD}$ and $K_{CKE}$ to be of unequal arbitrary lengths as well as the output key $K_F$ to be of arbitrary length. Importantly, using PRF also allows data such as exchanged protocol messages as an input field so that the final key is tightly bound to the exchanged protocol messages. A suitable PRF may be realized using a HMAC-based key derivation function (KDF), the function being known as HKDF. HKDF is a function that takes as input some source keying material, extracts from the input material a fixed-length pseudorandom key, and expands the fixed-length key into further pseudorandom keys which become the output.

Returning to the network of FIG. 4, in an embodiment, the second communication network is a classical communication network 2 comprising an authenticated communication channel between the two nodes such that the identity of at least one node is authenticated. Channel authentication is implemented using an agreed transport layer security (TLS) protocol where authentication relies on a secret key, pre-shared between the two nodes.

In one embodiment, given an authenticated communication channel, where authentication between the source and destination nodes is realized using a pre-shared key, the second cryptographic key, $K_{CKE}$, is exchanged between the source and destination node according to a conventional key exchange (CKE) algorithm.

Figure 6A:
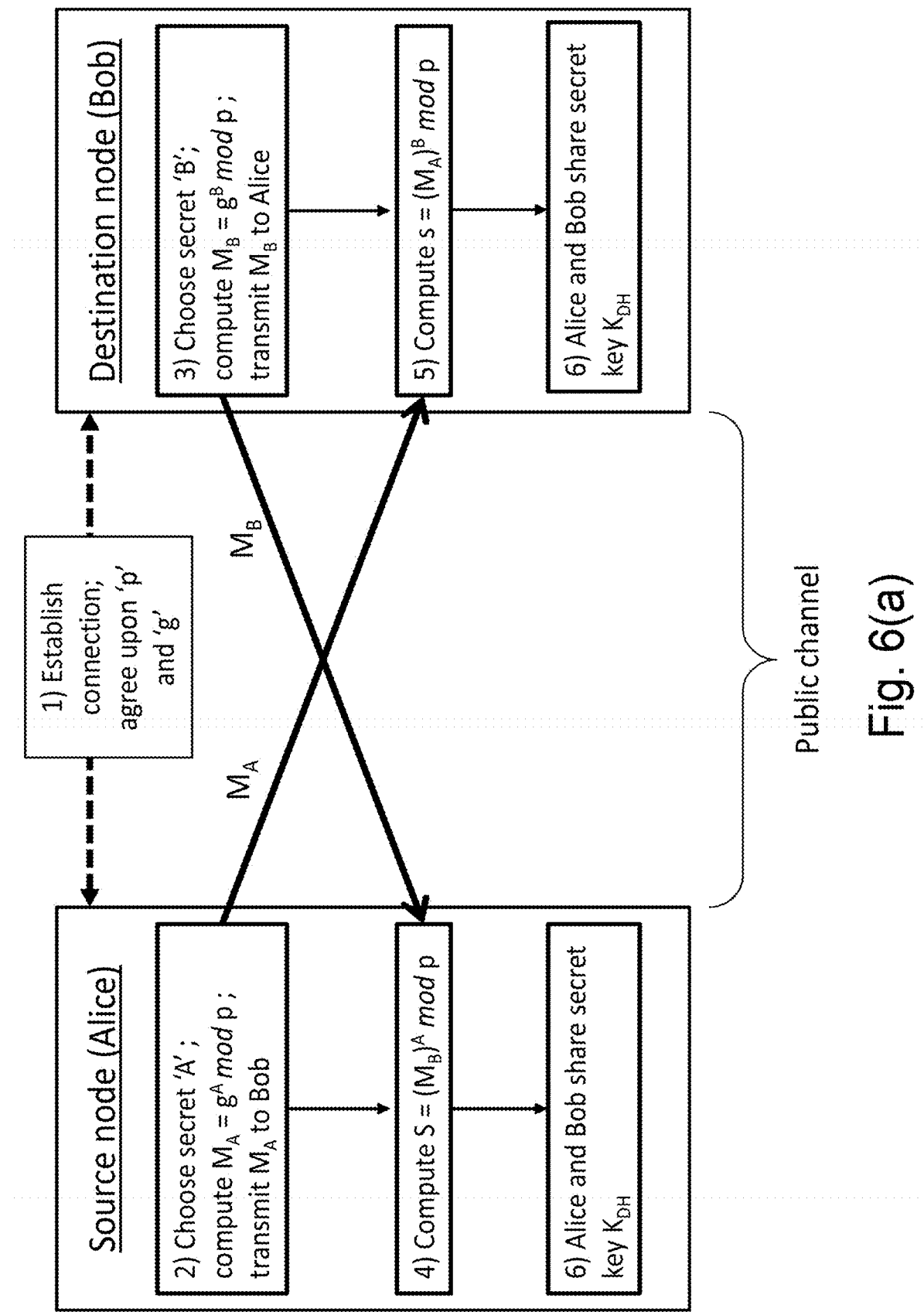
FIG. 6(a) illustrates the process of classical key exchange between a source node (Alice) and a destination node (Bob), according to an algorithm, used in a method for exchanging a second cryptographic key in accordance with an embodiment.
Figure 6B:
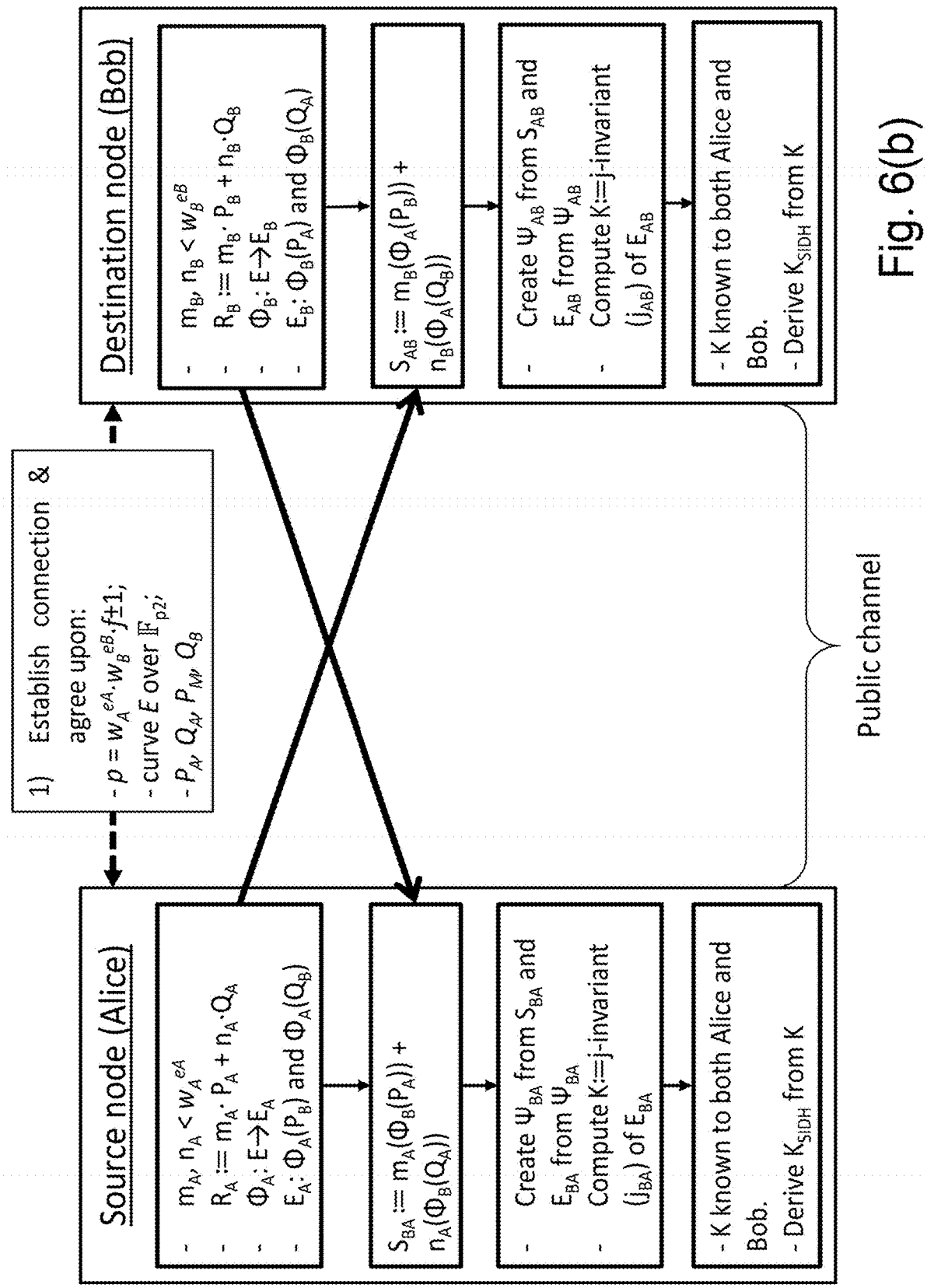
FIG. 6(b) illustrates the process of classical key exchange between a source node (Alice) and a destination node (Bob), using a quantum resistant algorithm used in a method for exchanging a second cryptographic key in accordance with an embodiment.

Such an algorithm could be the Diffie-Hellman (DH) protocol, as shown in the FIG. 6(a). In DH key exchange, Alice and Bob agree upon p and g, and $M_A = g^A \bmod p$ is sent from Alice to Bob, and $M_B = g^B \bmod p$ is sent from Bob to Alice. DH is said to have computational security because of the computational complexity of finding $g^{AB}$ given g and values of $g^A$ and $g^B$.

Given an authenticated communication channel, where authentication between the source and destination nodes is realized using a pre-shared key, the second cryptographic key, $K_{CKE}$, is exchanged between the source and destination nodes according to a quantum-resistant algorithm (QRA), and the second cryptographic key is represented by $K_{CKE} = K_{QRA}$.

In a further embodiment, QRA key exchange is used over a public channel and/or the public channel is implemented on a classical communication link. The public channel may be the Internet.

Public key cryptography using QRA includes lattice, multivariate, hash, code, and supersingular elliptic curve cryptography, for example. Lattice cryptography includes learning with error (LWE) and Ring-LWE (R-LWE) cryptography.

In one embodiment QRA key exchange is implemented using the Supersingular isogeny Diffie-Hellman method (SIDH). Alice and Bob share the following public parameters at the beginning of a session: 1. A prime of the form $p = w_A^{eA} w_B^{eB} f \pm 1$; 2. A supersingular elliptic curve E over $\mathbb{F}_{p^2}$; 3. Fixed elliptic points $P_A$, $Q_A$, $P_M$, $Q_B$ on E, where the order of $P_A$ and $Q_A$ is $(w_A)^{eA}$, the order of $P_B$ and $Q_B$ is $(w_B)^{eB}$. Alice and Bob each separately generate two random integers $m_A$, $n_A < w_A^{eA}$ and $m_B$, $n_B > w_B^{eB}$. Alice generate $R_A := m_A \cdot P_A + n_A \cdot Q_A$, Bob generates $R_B := m_B \cdot P_B + n_B \cdot Q_B$. Alice uses $R_A$ to do the mapping $\Phi_A: E \rightarrow E_A$; Bob uses $R_B$ to do the mapping $\Phi_B: E \rightarrow E_B$. Alice applies $\Phi_A$ to $P_B$ and $Q_B$ to form $E_A: \Phi_A(P_B)$ and $\Phi_A(Q_B)$; Bob applies $\Phi_B$ to $P_A$ and $Q_A$ to form $E_B: \Phi_B(P_A)$ and $\Phi_B(Q_A)$. Alice sends to Bob $E_A$, $\Phi_A(P_B)$ and $\Phi_A(Q_B)$; Bob sends to Alice $E_B$, $\Phi_B(P_A)$ and $\Phi_B(Q_A)$. Alice then forms $S_{BA} := m_A(\Phi_B(P_A)) + n_A(\Phi_B(Q_A))$; Bob forms $S_{AB} := m_B(\Phi_A(P_B)) + n_B(\Phi_A(Q_B))$. Alice uses $S_{BA}$ to create an isogeny mapping $\Psi_{BA}$ and uses $\Psi_{BA}$ to create an elliptic curve $E_{BA}$, which is isogenous to E. From $E_{BA}$, Alice computes K:=j-invariant ($j_{BA}$) of $E_{BA}$. Similarly, Bob uses $S_{AB}$ to create an isogeny mapping $\Psi_{AB}$ and $\Psi_{AB}$ to create an elliptic curve $E_{AB}$, which is isogenous to E, and computes K:=j-invariant ($j_{AB}$) of $E_{AB}$. $E_{BA}$ and $E_{AB}$ are isogenous to E and therefore have the same j-invariant. Therefore, K is known to both Alice and Bob and a shared key, $K_{SIDH}$, is derived from K.

In another embodiment, QRA key exchange between a source node (Alice) and a destination node (Bob) may be implemented according to R-LWE as follows: Alice and Bob each have their own secret $S_A$ or $S_B$ respectively; Alice and Bob agree upon a set of public information P; Alice may then compute $P * S_A$ and transmit $P * S_A$ to Bob, and Bob may compute $P * S_B$ and transmit $P * S_B$ to Alice; and both Alice and Bob may form a shared key based on their results of $S_A * P * S_B$. The shared QRA key, based on $S_A * P * S_B$, is denoted as $K_{QRA}$. Security is guaranteed by the computational hardness of finding $S_A$ or $S_B$ from the information, $P * S_A$ or $P * S_B$, which is transmitted through the public channel.

Figure 6C:
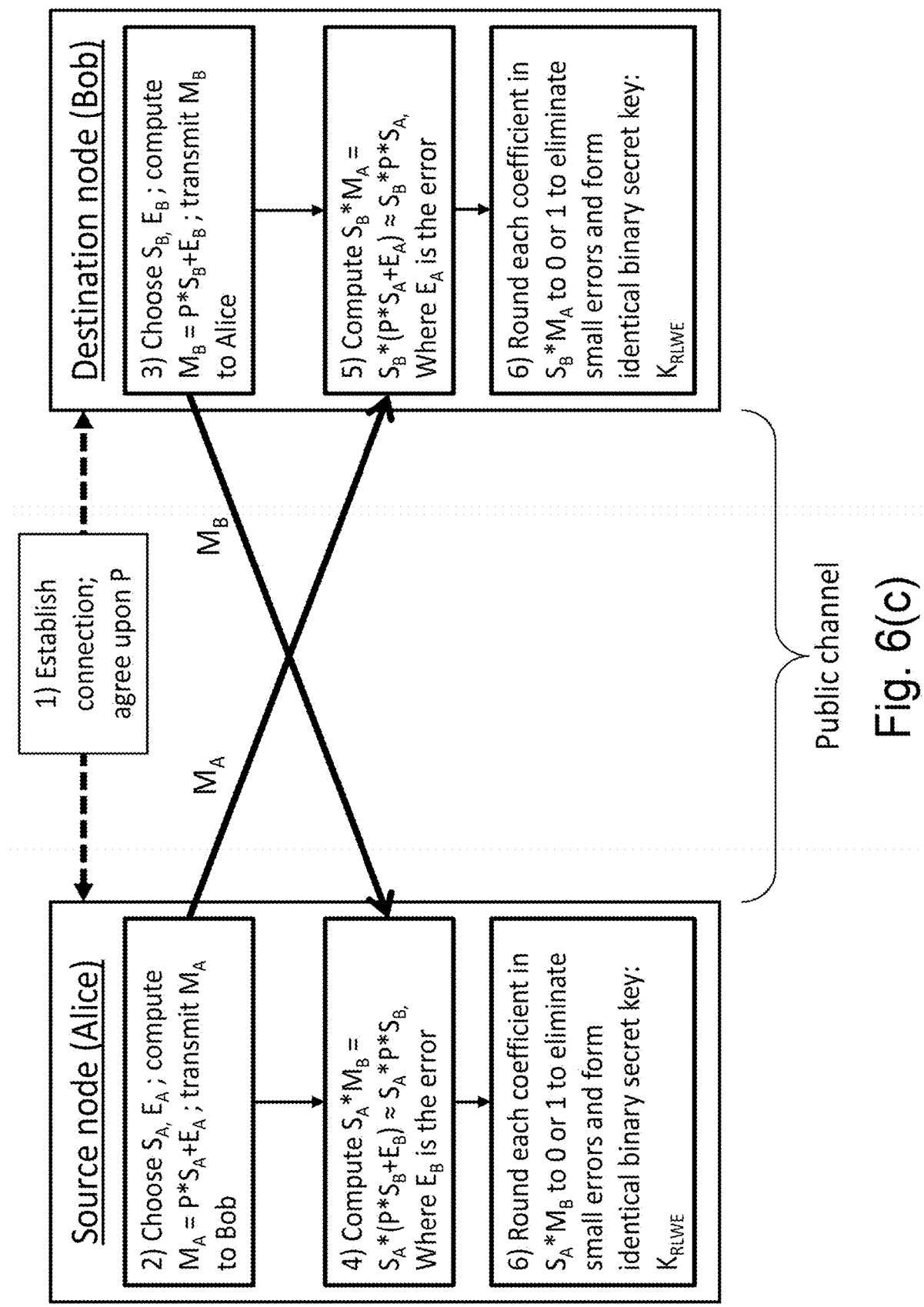
FIG. 6(c) illustrates the process of classical key exchange between a source node (Alice) and a destination node (Bob), using another quantum resistant algorithm, used in a method for exchanging a second cryptographic key in accordance with an embodiment.

FIG. 6(c) illustrates an embodiment where R-LWE cryptography is used to implement QRA key exchange. The public information P is a polynomial, $S_A$ comprises two vectors $V_A$ and $E_A$, and $S_B$ comprises two vectors $V_A$ and $E_A$. The coefficients in $V_A$, $E_A$, $V_B$ and $E_B$ are integers, and furthermore, the coefficients of $E_A$ and $E_B$ are small and may be viewed as errors. The procedure for R-LWE key exchange is the following: 1) Alice and Bob establish a connection and agree upon P, 2) Alice choses a random secret $S_A$ and $E_A$, and computes $M_A=P*S_A+E_A$, and transmits $M_A$ to Bob, 3) Bob choses a random secret $S_B$ and $E_B$, and computes $M_B=P*S_B+E_B$, and transmits $M_B$ to Alice, 4) Alice computes $S_A*M_B=S_A*(P*S_B+E_B)\approx S_A*P*S_B$, with $E_B$ as error, 5) Bob computes $S_B*M_A=S_B*(P*S_A+E_A)\approx S_B*P*S_A$, with $E_A$ as error, 6) by rounding each coefficient in $S_A*M_B$ or $S_B*M_A$ to 0 or 1, Alice and Bob can eliminate the small errors and form an identical binary secret key, $K_{RLWE}$.

In the embodiment shown in FIG. 4, the source node A and destination node F may be configured to: transmit and receive information over a second communication network 2; generate a second key; and perform secure key exchange according to a quantum-resistant algorithm. Source node A and destination node F may comprise: a second communication unit operable on the second communication network 2 and configured to transmit and receive information; a second key generator configured to implement an agreed key exchange protocol on the second communication network 2; and a processor configured to implement a quantum resistant algorithm to generate a second key for the second key generator.

Returning to the communication network of FIG. 4, source node A and destination node F share two keys; a first key ($K_{QKD}$), and a second key ($K_{QRA}$). $K_{QKD}$ is exchanged through the quantum communication network, through intermediate repeater nodes, as described herein. $K_{QRA}$ is securely exchanged through the second communication network using a quantum-resistant algorithm as described herein.

Both keys $K_{QKD}$ and $K_{QRA}$ may be considered secure. The security of $K_{QKD}$ relies on the intermediate repeater nodes being trusted nodes, while the security of $K_{QRA}$ is independent of the repeater nodes, but depends on the security of the pre-agreed information (P) between the two nodes as well as the CKE protocol itself.

A combined cryptographic key, K, is formed from the two keys $K_{QKD}$ and $K_{QRA}$ as described herein. The security of the combined cryptographic key may be at least as strong as the security of the stronger of $K_{QKD}$ or $K_{QRA}$. In an embodiment, the combined cryptographic key, K, is formed using the following operation $K=K_{QKD} \oplus K_{QRA}$, where $\oplus$ is the bit-wise exclusive-or logical operation. The two keys $K_{QKD}$ and $K_{QRA}$ are equal in length.

The combined cryptographic key may be formed using other operations such as, for example, universal hashing or PRF as discussed above. The two keys $K_{QKD}$ and $K_{QRA}$ can be of different lengths.

Figure 7:
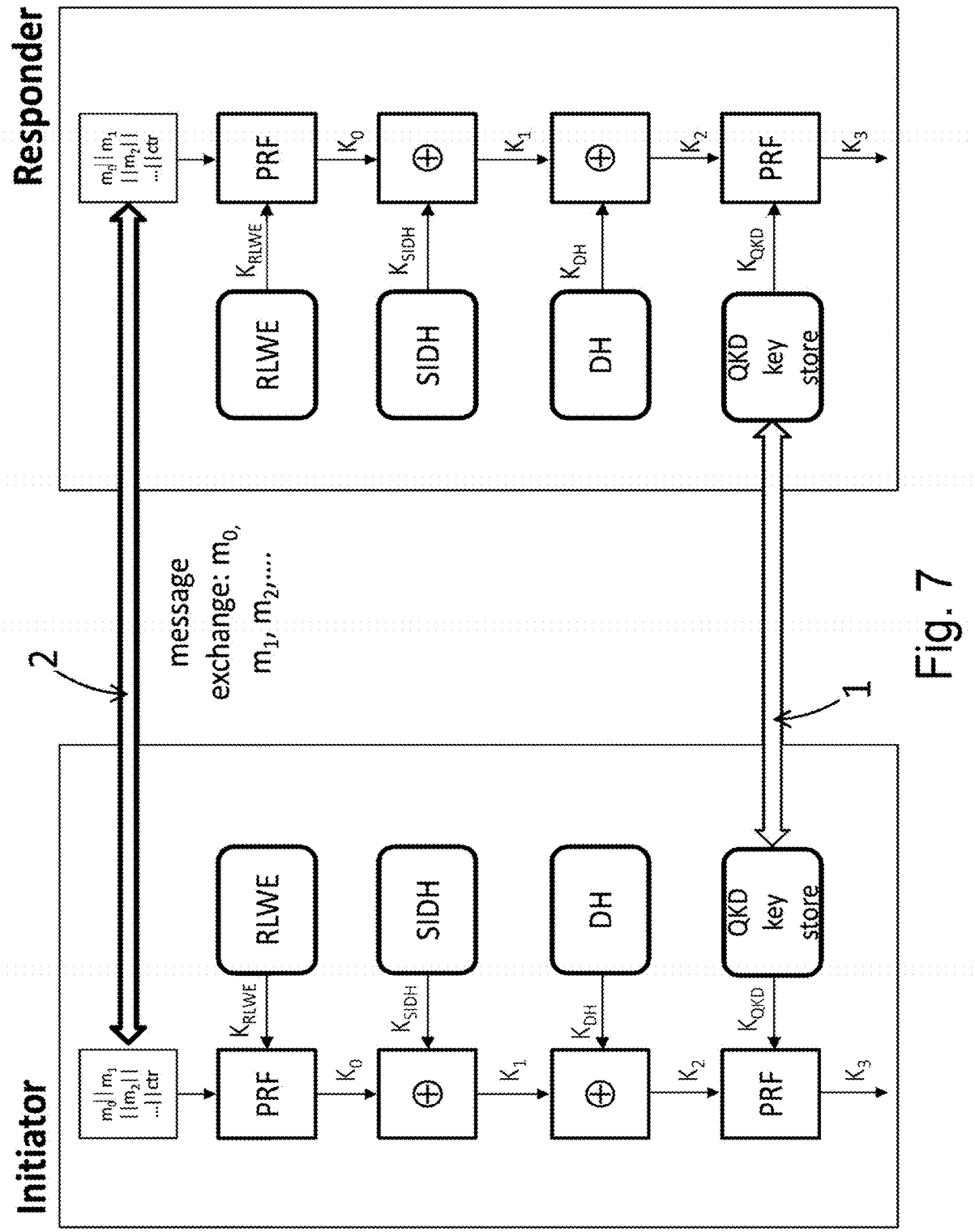
FIG. 7 is a schematic illustration of a method of exchanging a combined cryptographic key between a first node and a second node according to an embodiment, where one or more first keys are exchanged using a quantum communication network and one or more second keys are exchanged using a classical communication network, and the one or more first keys are combined with the one or more second keys to form a combined cryptographic key, such that the first node and the second node share knowledge of the combined cryptographic key.

FIG. 7 is a schematic illustration of an embodiment that shows key exchange of one or more first keys on a quantum communication network 1 and key exchange of one or more second keys on a classical communication network 2. The combination of the two keys is illustrated.

The initiator and responder are located at the two distant nodes in a QKD network. Each node consists of a QKD key store 103, dedicated for secure communication between its intended communication peer. For example, node A (FIG. 4) has a key store "store A-F", which is dedicated for communication with node F. Equally, node F has a corresponding key store "store F-A" which holds identical keys as those in "store A-F". Through index synchronisation, nodes A and F return identical quantum keys from their key stores. The index in each node can be synchronised through a session counter represented by the variable 'ctr' in FIG. 7; the variable 'ctr' is exchanged between the initiator and responder nodes such that both return identical quantum keys from their key stores. When the initiator and responder nodes have a direct QKD link, their key stores will be populated with the quantum keys formed between them. In the case they do not have a direct QKD link, they will use QKD network and its associated key delivery techniques via intermediate nodes to form quantum keys between them, as described above in relation to FIG. 3. These quantum keys can then populate their mutual quantum key stores.

In addition to QKD, the initiator and responder nodes in this example also exchange three keys according to CKE algorithms, namely, ring learning with error (RLWE), super-singular isogeny Diffie-Hellman (SIDH) and Diffie-Hellman (DH). RLWE, SIDH, and DH are classical key exchange protocols. RLWE and SIDH are believed to be quantum resistant, while DH has computational security. Example implementation of RLWE and SIDH has been included in the Open Quantum Safe (OQS) project. DH, SIDH, and RLWE are described above in relation to FIGS. 6(a), (b) and (c).

In this example, three different classical key exchange protocols have been included but it will be understood that any other number from 1 to infinity number of classical protocols can be integrated. For example, a method can include RLWE and omit SIDH and DH.

All classical KEs require pre-shared secret for authentication. This pre-shared secret can either be agreed during the installation of the QKD network or be obtained through the use of public key cryptography with help of a certifying authority. This pre-shared secret can be replenished with the keys finally derived or exchanged.

CKE require exchanges of classical messages for handshaking and computing their secret keys. In one embodiment, to reduce latency caused by these message exchanges, the messages of all classical KEs are combined. The "hybrid" protocol starts with message exchanges for RLWE, SIDH and DH. The messages exchanged are depicted as $m_0$, $m_1$, $m_2$ and so on, where $m_0$, $m_1$, $m_2$ represent different rounds of messages. Each message may contain information for different CKE protocols, e.g., m0 may contain relevant information for $K_{RLWE}$, $K_{SIDH}$, and $K_{DH}$. Each CKE protocol computes their own keys, $K_{RLWE}$, $K_{SIDH}$, $K_{DH}$ respectively by extracting the relevant information from each message, and each CKE is performed independently from one another.

A pseudo-random function (PRF) takes $K_{RLWE}$ and all classical messages and session counter 'ctr' as inputs and computes a key, $K_0$. PRF is suitable at this stage because it allows arbitrarily long messages as its input. Note that the initiator and responder have same messages and the same $K_{RLWE}$ exchanged with RLWE. Therefore, $K_0$ at both sides will be identical. Similarly, in the next stages, $K_0$ and $K_{SIDH}$ are combined to form $K_1$; $K_1$ and $K_{DH}$ are combined to form $K_2$. In this example, an exclusively-or logic operation is used for combining the keys. In this case, $K_{RLWE}$, $K_0$, $K_{SIDH}$, $K_1$, $K_{DH}$, and $K_2$ have identical length, e.g., 256-bits each. Alternatively, PRF can also be used.

In the stage for combining with QKD keys, session counter information is used to derive the key index in the QKD key store and a corresponding key is called from the QKD key stores at both nodes. The Quantum key $K_{QKD}$ is then combined with $K_2$ using PRF to form $K_3$. PRF is preferable because it allows derivation of multiple keys. One of such keys can be used for confirmation of success of the protocol execution. However, it is possible also to use exclusive or operation for combining the quantum key $K_{QKD}$ and the classical $K_2$ of equal length.

The nodes in FIG. 7 may each contain a processor configured to perform the combination of the classical and QKD keys to obtain a combined cryptographic key. The processor may be a central processing unit (CPU), graphical processing unit (GPU), or a field programmable gate array (FPGA).

Figure 7B:
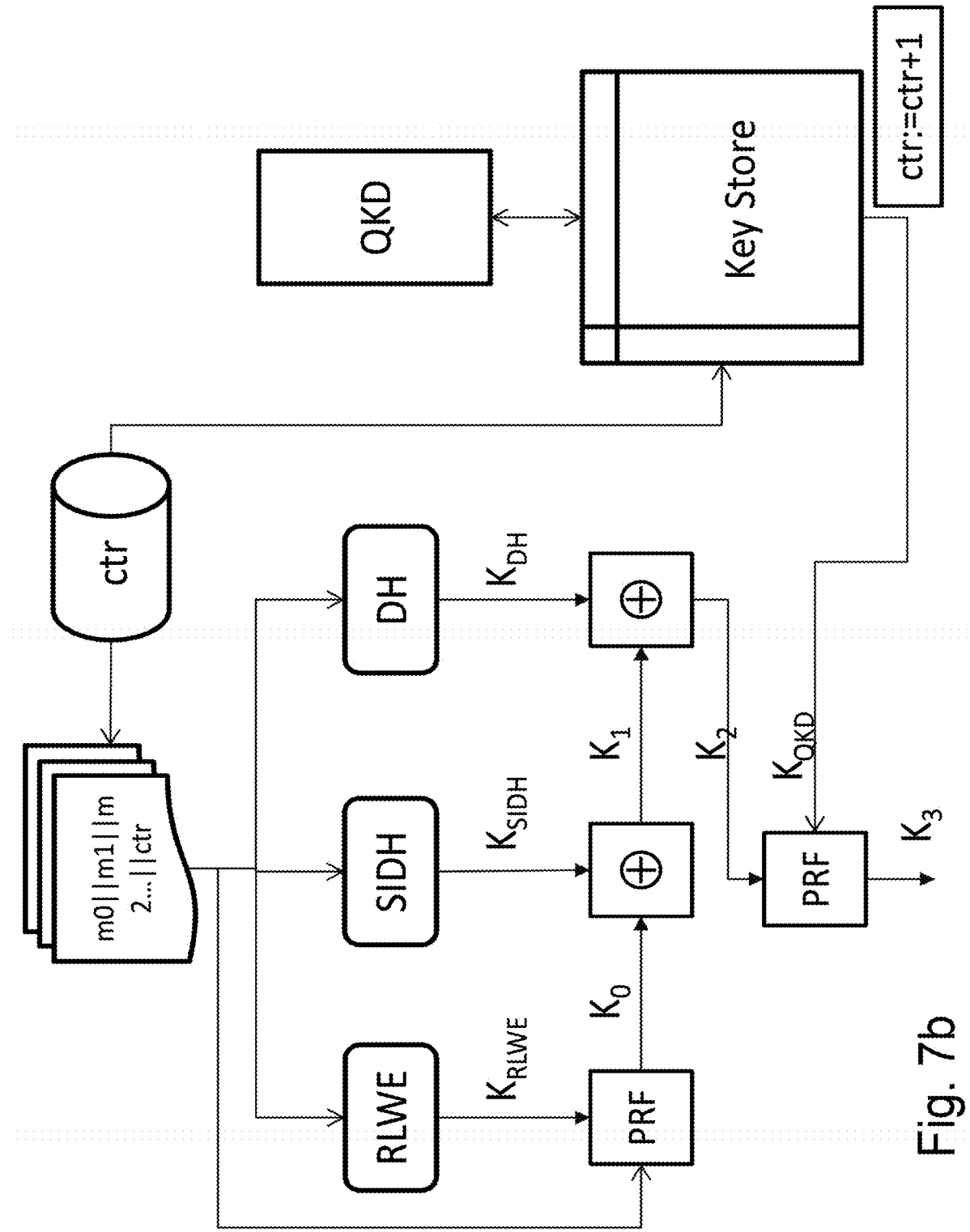
FIG. 7b is a schematic illustration of a method combining a cryptographic key between a first node and a second node according to according to an embodiment showing the key combination process in the first or second node of FIG. 7.

FIG. 7b is a flowchart illustrating the key combination process in the initiator or responder node of FIG. 7. The first cryptographic keys are obtained by QKD as described in relation to FIG. 3 and the keys thus obtained are stored in an indexed key store, where each entry in the key store corresponds to a QKD key for a particular pair of nodes. Key exchange via QKD on the quantum communication network runs continuously and independently of the CKE and QKD keys are stored in the key store.

For CKE, the first step is the exchange of messages for handshaking and computing of the secret keys. The messages exchanged are depicted as $m_0$, $m_1$, $m_2$ and so on. To reduce the communication latency, each message, e.g., $m_0$, may contain handshake messages for different CKE protocols. After the classical message exchanges, all classical messages are combined by concatenating together as m0∥m1∥m2. The combined message may also include a value for the counter 'ctr'. The concatenated message is used later as an input to the PRF so as to have the benefit of preventing an adversary from changing the communication messages. If an adversary does so, the initiator and the responder will have mismatched classical keys because the CKE keys depend on the combined message. Each classical key $K_{RLWE}$, $K_{SIDH}$, $K_{DH}$ is then derived from the individual messages $m_0$, $m_1$, $m_2$. The derivation of those keys is independent and can be performed all at the same time (in parallel) or one after the other (sequentially). However, to derive $K_0$, $K_{RLWE}$ must be available; to derive $K_1$, $K_{SIDH}$ and $K_0$ must be available; to derive $K_2$, $K_1$ and $K_{DH}$ must be available; and to derive $K_3$, $K_{QKD}$ and $K_2$ must be available. Thus, the node may contain buffers or temporary storage units (not shown) configured to store classical keys until the necessary keys become available.

$K_{QKD}$ is provided by QKD key stores with counter as index information. Once $K_{QKD}$ is successfully provided, the counter is incremented by 1: ctr:=ctr+1. With the counter incremented, a different QKD key from the key store may be used when there is a new request for a QKD key.

After one key exchange session, a key $K_3$ is obtained. $K_3$ may be used as the secure key for subsequent encryption and communication.

Alternatively, it is possible to include a key confirmation step. In this case, the PRF combining $K_2$ and $K_{QKD}$ produces two parts output, $K_{enc}$ for encryption, and $K_F$ for the initiator and responder to confirm they have identical keys. If the confirmation is successful, $K_{enc}$ will be passed for subsequent applications. If not, the key exchange protocol is restarted.

In another embodiment, the first key $K_{QKD}$ may comprise one or more sub-keys; for example, $K_{QKD}$ may be formed as $K_{QKD}=K_{q1} \oplus K_{q2} \oplus K_{q3}$, where $K_{q1}$, $K_{q2}$, and $K_{q3}$ are each QKD sub keys. The QKD sub-keys may alternatively be combined using a function such as the PRF described above, instead of or along with the $\oplus$ function. Each QKD sub-key may be formed from a different QKD key exchange, for example, by routing through different repeater nodes, or using different algorithms.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A method of exchanging a combined cryptographic key between a first node and a second node,
the first node and the second node being connected through a first communication and a second communication network, wherein the first communication network comprises a quantum communication network wherein information is encoded on weak light pulses, and wherein the first communication network comprises at least one intermediate node, other than the first node and the second node, said intermediate node configured to receive and transmit a signal encoded on weak light pulses; and
the first node and the second node being configured to:
exchange one or more first cryptographic keys on the first communication network;
exchange one or more second cryptographic keys on the second communication network, wherein the second cryptographic key is exchanged between the first and second node with a quantum-resistant algorithm; and
form the combined cryptographic key by combining the one or more first cryptographic keys and the one or more second cryptographic keys, such that the first node and the second node share knowledge of the combined cryptographic key,
wherein the first node is configured to send information through the first communication network to:
exchange a quantum cryptographic key with the at least one intermediate node;
generate a local secret key, the local secret key being used to form the one or more first cryptographic keys;
form a further key using the local secret key and the quantum cryptographic key; and
transmit the further key to the at least one intermediate node.

2. A method according to claim 1, wherein the at least one intermediate node is configured to:
receive the further key;
extract the local secret key using the further key and the exchanged quantum cryptographic key;
form a second further key using the local secret key and the second quantum cryptographic key; and
transmit the second further key to another of the at least one intermediate node or to the second node.

3. A method according to claim 2, wherein the second node is configured to:
receive the second further key, and
extract the local secret key using the second further key and the second quantum cryptographic key, such that the second node has knowledge of the local secret key generated by the first node.

4. A method according to claim 1 wherein the second communication network is a classical network directly connecting the first node and the second node, the second communication network comprising a communication channel between the first node and the second node.

5. A method according to claim 4 wherein the second cryptographic key is exchanged between the first node and the second node using a classical key exchange protocol.

6. A method according to claim 1 wherein the quantum-resistant algorithm comprises lattice, multivariate, hash, code, and supersingular elliptic curve cryptography.

7. A method according to claim 1 wherein the one or more first cryptographic keys and the one or more second cryptographic keys are combined using operations comprising exclusive-or, and/or universal hashing, and/or pseudorandom functions.

8. A method according to claim 7 wherein the one or more first cryptographic keys have equal lengths with the one or more second cryptographic keys.

9. A method according to claim 7 wherein the one or more first cryptographic keys have different lengths from the one or more second cryptographic keys.

10. A method according to claim 1 wherein the first node and the second node are configured to store the one or more first cryptographic keys in an indexed key store, wherein each entry in the indexed key store corresponds to a particular pair of the first node and the second node.

11. A method according to claim 10 wherein the first node and/or the second node comprises a counter, the value of the counter being used to select the one or more first cryptographic key corresponding to the particular pair of the first node and the second node.

12. A method according to claim 11 wherein the counter is incremented after the one or more first cryptographic key is provided.

13. A communication network for exchanging a combined cryptographic key between a first node and a second node, wherein the first node and the second node are connected through a first communication and a second communication network, the first communication network comprising a quantum communication network wherein information is encoded on weak light pulses, and comprising at least one intermediate node, other than the first node and the second node, said intermediate node configured to receive and transmit a signal encoded on weak light pulses, and
the first node and the second node are configured to:
exchange one or more first cryptographic keys on the first communication network;
exchange one or more second cryptographic keys on the second communication network, wherein the second cryptographic key is exchanged between the first and second node with a quantum-resistant algorithm; and
form the combined cryptographic key by combining the one or more first cryptographic keys and the one or more second cryptographic keys, such that the first node and the second node share knowledge of the combined cryptographic key,
wherein the first node is configured to send information through the first communication network to:
exchange a quantum cryptographic key with the at least one intermediate node;
generate a local secret key, the local secret key being used to form the one or more first cryptographic keys;
form a further key using the local secret key and the quantum cryptographic key; and
transmit the further key to the at least one intermediate node.

14. A first node configured to exchange a combined cryptographic key with a second node on a communication network,
the first node being connected to at least one intermediate node through a first communication network, the first communication network comprising a quantum communication network wherein information is encoded on weak light pulses, wherein the first communication network comprises at least one intermediate node, other than the first node and the second node, said intermediate node configured to receive and transmit a signal encoded on weak light pulses, wherein the first node is configured to exchange a quantum cryptographic key with the at least one intermediate node; the first node being directly connected to the second node using a second communication network;
the first node and the second node being further configured to:
exchange one or more first cryptographic keys on the first communication network;
exchange one or more second cryptographic keys on the second communication network, wherein the second cryptographic key is exchanged between the first and second node with a quantum-resistant algorithm; and
form the combined cryptographic key using the one or more first cryptographic keys and the one or more second cryptographic keys, such that the first node and the second node share knowledge of the combined cryptographic key
wherein the first node is configured to send information through the first communication network to:
exchange a quantum cryptographic key with the at least one intermediate node;
generate a local secret key, the local secret key being used to form the one or more first cryptographic keys;
form a further key using the local secret key and the quantum cryptographic key; and
transmit the further key to the at least one intermediate node.

\* \* \* \* \*